Figure 1:
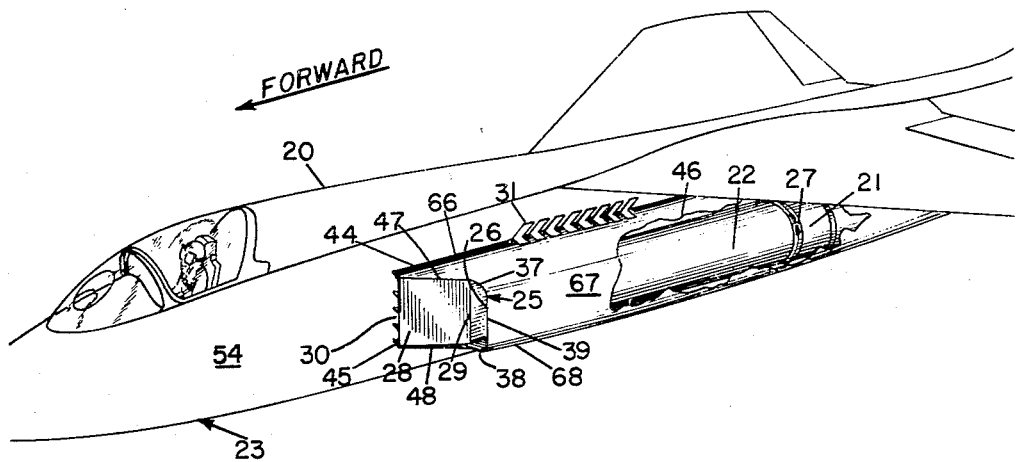

Aug. 30, 1960     M. MITROVICH ET AL     2,950,594

SHOCK WAVE INDUCING AND CONTROLLING MECHANISM

Filed June 13, 1955     4 Sheets-Sheet 1

INVENTOR.
Milenko Mitrovich
Nicholas V.S. Mumford
BY
W. R. Robertson
Agent

Aug. 30, 1960    M. MITROVICH ET AL    2,950,594
SHOCK WAVE INDUCING AND CONTROLLING MECHANISM
Filed June 13, 1955    4 Sheets-Sheet 2
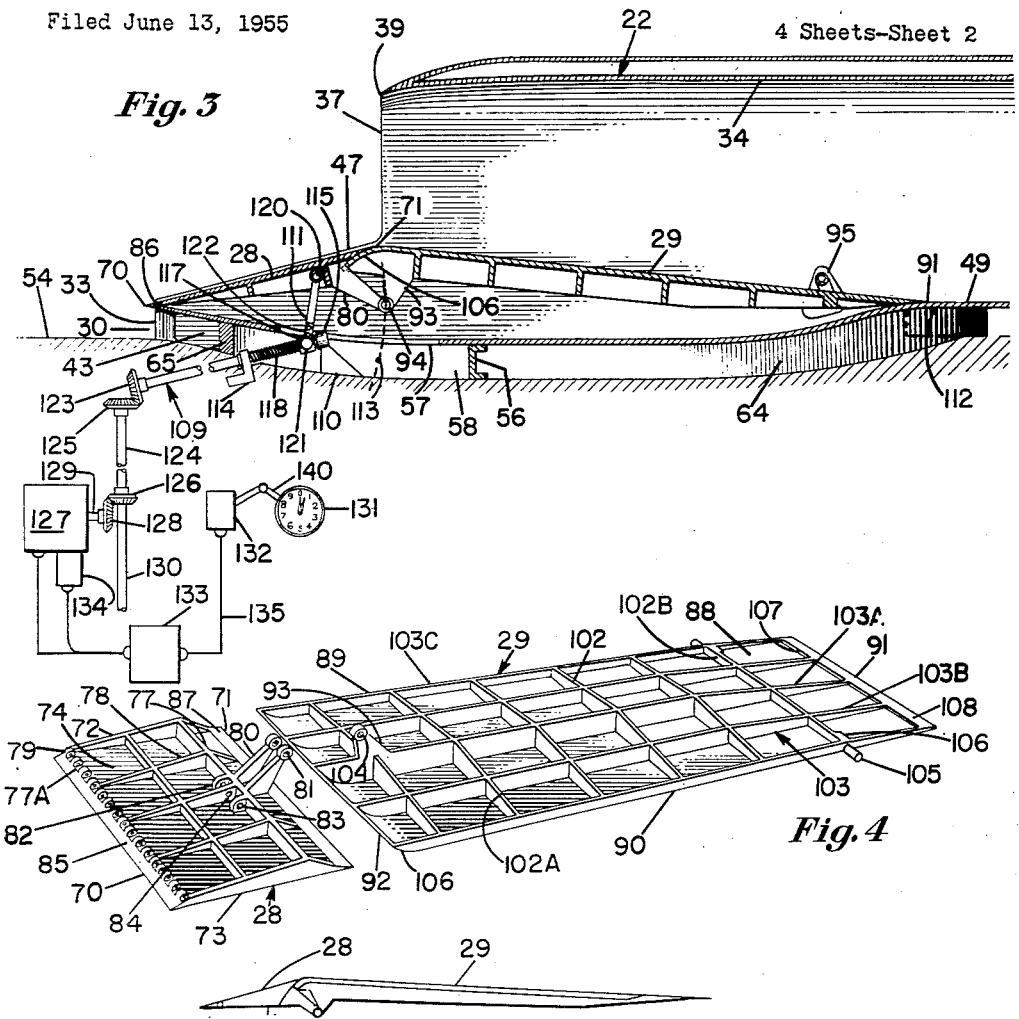
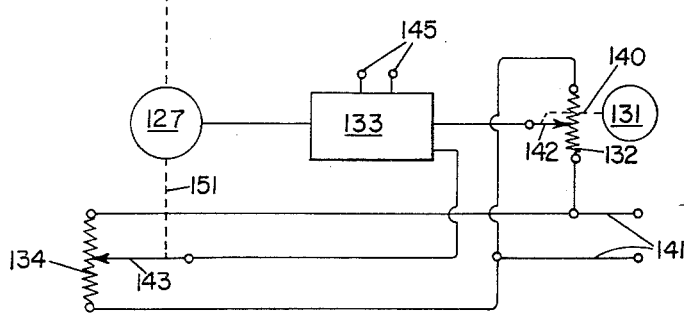
INVENTOR.
Milenko Mitrovich
Nicholas V.S. Mumford
BY
W. R. Robertson
Agent Mach No. 2.0

Mach No. 1.8

Mach No. 1.5

Mach No. 1.3

Mach No. 1.0

INVENTOR.
Milenko Mitrovich
Nicholas V.S. Mumford
BY
W. R. Robertson
Agent

INVENTOR.
Milenko Mitrovich
Nicholas V.S. Mumford

United States Patent Office 2,950,594
Patented Aug. 30, 1960

2,950,594

SHOCK WAVE INDUCING AND CONTROLLING MECHANISM

Milenko Mitrovich, Chestnut Hill, Mass., and Nicholas V. S. Mumford, Grand Prairie, Tex., assignors to Chance Vought Aircraft, Incorporated, Dallas, Tex., a corporation of Delaware Filed June 13, 1955, Ser. No. 515,104

14 Claims. (Cl. 60—35.6)

This invention relates to air induction means for jet engines operable for propelling aircraft and the like at supersonic velocities, and more specifically to an apparatus for engendering and controlling a pattern of shock waves in supersonic airflow adjacent the ram air inlet of an air duct.

Briefly described, the present invention comprises adjustable air-deflecting means, fairing means, actuating means, energizing means, and control means operable in association with a rearwardly divergent ram air inlet of a duct for supplying air to a jet propulsion engine in an aircraft or the like. The combined functions of these means is that of setting up, when the aircraft or the like is in supersonic flight, a series of shock waves adjacent the ram air inlet, the first wave of which extends obliquely across the streamtube of air upstreams of the inlet, and the last wave of which stands normal to the duct centerline at or near the forwardmost edge or rim of the duct inlet, the oblique angle of the first wave being varied in accordance with Mach number of flight as required for best efficiency of the duct throughout the aircraft's supersonic flight range. As is fully explained in later paragraphs, such a series of shock waves, when favorably located in relation to the ram air inlet of an air duct, is greatly beneficial to the efficiency with which the duct supplies air to a jet engine, and hence has a correspondingly beneficial effect on the strength of the propulsive thrust developed by the engine. The air-deflecting means includes a variable-incidence plate (or ramp) located at one side of the streamtube of supersonic air entering the ram air inlet, at least the forward edge of the ramp lying ahead of the inlet, and the ramp being pivotable into or out of impingement upon the airflow within the streamtube so as to enforce, where desired, an abrupt change in direction of travel upon the air approaching the duct inlet. The fairing means blends smoothly into the ramp aft edge at its forward end and into the duct wall at its aft end, is articulated to the ramp in such manner that the fairing moves with and remains substantially in contact with the ramp as the latter is deflected, and is swung at its aft end so as to maintain its aft edge substantially in contact with the duct wall in all positions occupied by the fairing in its following of ramp movements. The power means receives control signals or impulses from the control means, and in response supplies energy to the actuator means, which utilizes the received energy for production of forces that are applied to the ramp for deflecting the ramp into or out of the path of air entering the duct inlet. One possible control means continuously senses two sets of data: Mach number of the aircraft, and ramp position relative to the longitudinal centerline of the duct at the inlet. The control means compares these two sets of data and emits to the power means signals or impulses which correspond to the comparison result and which cause energization of the power means for deflection of the ramp to the angle appropriate to the existing flight Mach number. When this angle is arrived at by the ramp, control signal emission is such as to cause deenergization of the actuator means by the power means, thus halting the ramp in the currently proper position. When the aircraft flies at a speed of Mach 1.0 or less, no supersonic shock waves, beneficial or otherwise, can be formed at the ram air inlet. Under these conditions, the signal delivered to the energizing means by the control means is such as to result in deflection of the ramp by the actuator means to a position wherein the ramp is substantially parallel to the direction of flow of air approaching the inlet.

In jet propulsion engines, efficiency of operation is dependent on several factors, one of the most important of which is the efficiency with which the air induction system supplying air to the engine effects the transformation of velocity energy of inducted air into pressure energy. If the engine is of the turbo-jet sort, the volume of air consumed in a given time interval may be considered to be constant while engine r.p.m. is constant. Changes in pressure and hence in density, therefore, can significantly affect turbo-jet engine performance through their effect on the mass-flow of air into the engine (that is, the total mass of air consumed by the engine in a given time interval), the thrust developed by a turbo-jet engine being generally proportional to the mass-flow of air into the engine. With the volume of airflow being constant, and with the air entering the engine at a particular temperature, mass-flow increases in proportion to increases in density of the air, density in turn being proportional to static pressure; thus, a rise in static pressure in air supplied to a turbo-jet engine is, other factors remaining unaltered, accompanied by a corresponding and proportional increase in thrust developed by the engine.

Although differing in many respects from turbo-jet engines in their construction and operation, ram-jet engines also are greatly affected in their performance by variations in mass-flow of air into the engine, an increase in mass-flow generally tending to be accompanied by an increase in thrust. As in a turbo-jet engine, mass-flow into the engine may be increased by increasing the static pressure, hence the density, of the air entering the engine, other factors affecting mass-flow remaining unchanged. Thus, for most efficient operation of both turbo-jet and ram-jet engines, it is essential that the air induction system serving the engine should transform a high percentage of the velocity energy of inducted air into pressure energy for effecting a high mass-flow of air into the engine.

Where the relative velocity of air before induction is high, and where it is possible to slow the air greatly before its entry into the engine, the rise in static pressure of the air may be considerable. If the total energy of air moving at Mach 2.0 could be converted isentropically into pressure energy, a static pressure recovery ratio of about 7.8:1 would be obtained, by "static pressure recovery ratio" being meant the ratio of the static pressure of the air after the conversion to that of the air before the conversion. If the total energy of air moving at a velocity of Mach 2.9 were transformed into pressure energy, the static pressure ratio would increase to approximately 31:1. In practice, energy losses and unavailabilities of a number of sorts cause the efficiency of the transformation of total energy into static pressure energy to be reduced considerably below the theoretically possible values, with the result that static pressure recovery ratios such as quoted above are never attained in any air induction means supplying air to a jet engine. It is obviously impractical to slow the air to zero velocity at the downstream end of an engine air duct, since to do so would preclude the flow of any air from the duct into the engine; hence, a large amount of the total energy of the air is not subject to transformation into pressure energy. Frequently held to minimum values by good design, but never entirely eliminated, duct bend losses, diffusion losses, and friction losses inevitably effect some reduction in the total energy of inducted air at all airspeeds. When flight is at supersonic speeds, serious losses of energy may accompany, and generally do accompany, the appearance of a shock wave or waves forward of the ram air inlet of the duct. The patterns or configurations in which such shock waves may occur may be complex; however, for practical purposes, it may be said that all cases include a normal shock wave standing upstream of the duct inlet rim and that most or all the deceleration of the air from its original supersonic speed to a subsonic speed occurs abruptly within the one normal shock wave. As entropy changes in the air under such conditions may be high, much of the total energy of the air may become unavailable, and efficiency of the air induction system suffers accordingly. The seriousness of the energy loss from this source is relatively small where flight is only slightly in excess of Mach 1.0, since at such speeds the velocity change sustained by the air in breaking from a supersonic to a subsonic speed across the normal shock wave is relatively small and occasions correspondingly small entropy changes. Entropy changes, with accompanying duct efficiency losses, rapidly increase with increase in flight Mach number above 1.0, and generally are responsible for the majority of the losses in duct efficiency at high Mach numbers. To illustrate the magnitude of such losses, a static pressure recovery value as large as 70 percent of the theoretical complete recovery value is commendably good in an ordinarily well-designed single normal shock air inlet duct in an aircraft operating at about Mach 2.0. In addition to the disadvantages enumerated above, the single normal shock wave may be accompanied by considerable turbulence of air in and about the duct inlet, thus diminishing the smoothness of airflow through the duct, much subsonic air may spill about the rim of the inlet, and the over-all drag imposed upon the aircraft may be appreciably increased.

As the entropy change in air moving through a mild shock wave is much smaller in proportion to the accompanying moderate change in velocity than is the entropy change where the shock is severe and the change in velocity is large, the total loss of available energy which is sustained by air progressively slowed from a given supersonic to a given subsonic speed by means of two or more relatively mild shock waves is significantly less than where the entire negative acceleration is accomplished by a single severe shock wave. For any given supersonic speed, it is possible to design ram air inlet geometries which will provide a series of shock waves in the inlet area that will efficiently slow the ram air to subsonic speed as it approaches and enters the inlet. For example, a first shock wave may be set up at a desired angle to the lengthwise axis of the duct and to the flow-direction of the approaching supersonic air, followed by a second shock wave at the forward edge or rim of the inlet, the second shock wave lying normal to the duct's lengthwise axis. With this arrangement, the air entering the first shock wave has a given supersonic velocity expressible as a particular Mach number relative to the duct; but, because of the angle at which it approaches the shock wave, the effective velocity of the air upstream of the shock wave is less than the velocity of the same air toward the inlet, the term "effective velocity" being employed herein to designate the velocity normal to the shock wave of the air upstream of the shock wave. At the time of passing through the first shock wave, the direction of flow changes, the second direction of flow not being parallel to the lengthwise axis of the duct, but instead parallel to the ramp or plate; and the speed of the air is reduced from its original high supersonic speed to a lower supersonic speed along the new flow-direction. The slowed air traveling at an angle to the duct axis encounters the second shock wave at an angle of 90 degrees, the second shock wave in this case lying normal to the ramp. In passing through the second shock wave, the air is again slowed, and emerges at subsonic velocity relative to the duct. Abrupt slowing of the air to a subsonic velocity by a single severe shock wave ahead of the duct is thus avoided, the cumulative entropy change across the two shock waves is substantially less than would be experienced across one severe shock wave, and the efficiency of the air duct receiving the air which has passed through the two shock waves is improved to such extent that, for example, it may effect a static pressure recovery value of 90 percent or more of the theoretical complete recovery value at a flight Mach number of 2.0 when the shock waves are at proper angle and otherwise lie in proper position relative to the ram air inlet of the duct.

Although, for any given supersonic speed, it is entirely possible to design ram air inlet geometries for engendering and properly positioning a pattern of shock waves such as described above, shock wave configurations tend to change with flight Mach number, and it is necessary to vary the inlet geometry to suit the conditions of flight, or else the induction of ram air will be inefficient when operation is at any Mach number other than that for which the inlet geometry is particularly designed.

When an airflow changes from a supersonic to a subsonic speed, or vice versa, radical changes occur in the airflow behavior, including the complete disappearance of some flow characteristics, and the initial appearance of others not previously observable. Consequently, an inlet whose geometry renders it most efficient for induction of air at a particular supersonic speed is not well adapted for highly efficient air induction in the subsonic range. For best results at all speeds, it is desirable that the inlet geometry should be continuously variable from a configuration providing high efficiency in the subsonic range through a range of inlet geometries providing best efficiency of air induction throughout the supersonic range of the aircraft. To prevent drag upon the aircraft and to save impairing the efficiency of the inlet, it is desirable that the structure for inducing and controlling shock waves should actually or in effect be removed from the airstream during subsonic flight.

It is accordingly an object of this invention to provide an apparatus for inducing, in supersonic airflow adjacent the ram air inlet of an air duct, a series of shock waves whose nature and location are favorable to most efficient operation of the duct in its function of supplying air to a jet engine of an aircraft or the like with which the air duct is associated.

Another object of the invention is to provide an apparatus of the character stated including a member deflectable into and out of the airstream at one side of the ram air inlet so as to vary the geometry of the inlet for the induction and control of such shock waves at supersonic speeds.

A further object is to provide an apparatus of this character which includes a novel, effective mechanism for positioning the deflectable member, such mechanism being simple in construction and action.

Still another object of this invention is to provide an apparatus of the character thus far stated which includes means continuously responsive to or influenced by the position of the deflectable member and further responsive to or influenced by the flight Mach number of the aircraft or the like with which the apparatus is associated for effecting fully automatic variation of the position of the deflectable member in accordance with said Mach number.

A still further object is to provide an apparatus of the character stated in which is included means for smoothly fairing the downstream side of the deflectable means to the duct wall, and in which, in subsonic flight, the deflectable means and fairing impose no added drag on the aircraft nor in any way interfere with efficient subsonic operation of the ram air inlet.

Other objects and advantages will be apparent from the specification and claims, and from the accompanying drawings which illustrate an embodiment of the invention.

In the accompanying drawings, in which like numerals are employed throughout for the purpose of designating like parts, Figure 1 is a perspective view of an aircraft to which one form of the present invention has been applied, showing externally visible components of that invention and having some of the fuselage skin broken away for showing related internal parts.

Figure 2:
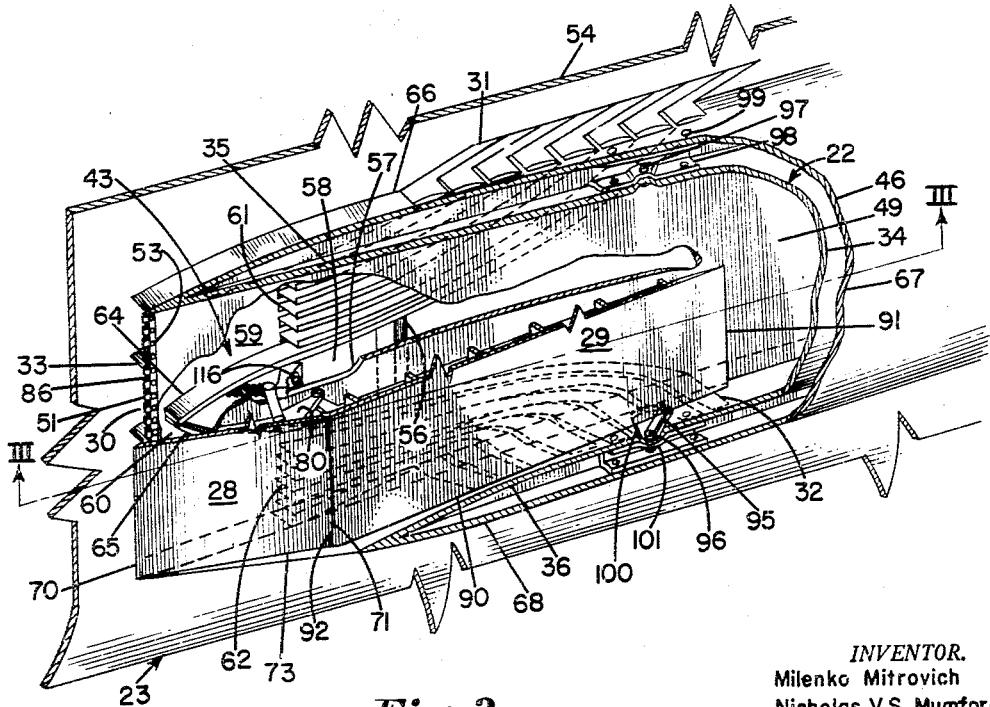
Figure 11:
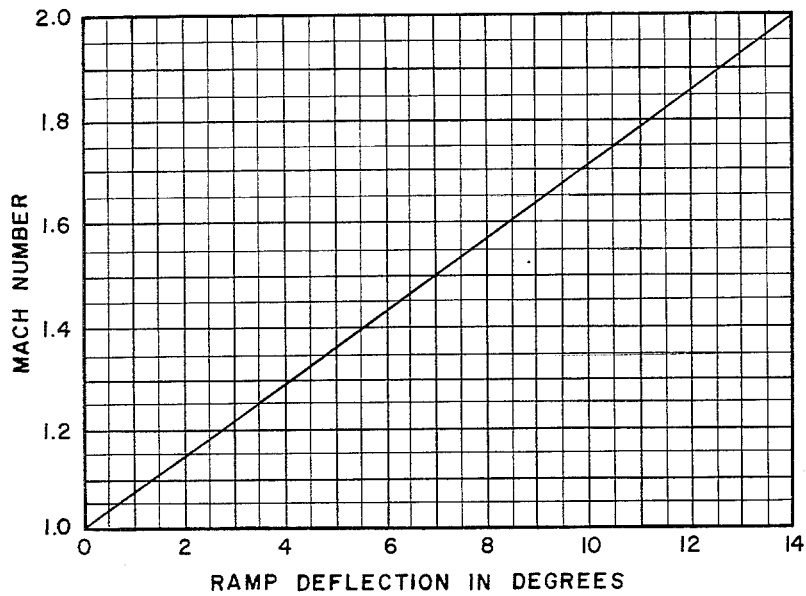
Figure 12:
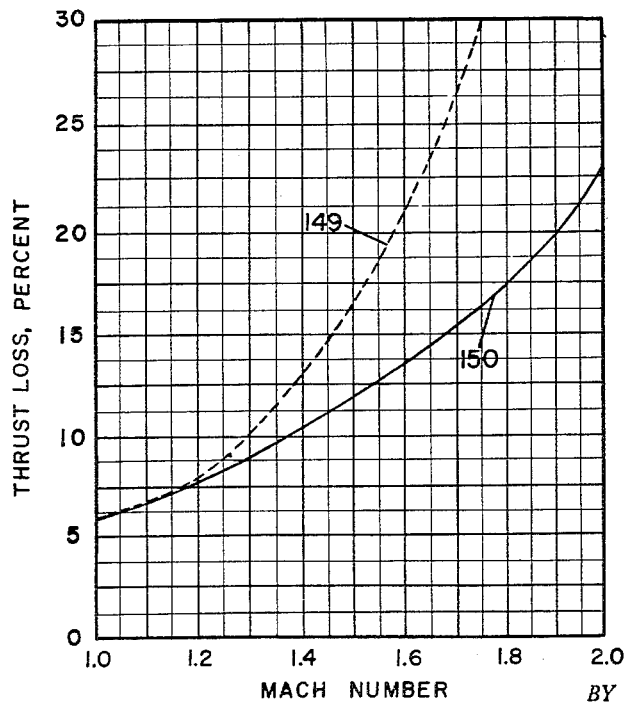

Figure 2 is an enlarged perspective view wherein portions of an engine air duct of the aircraft have been cut away to more fully reveal certain components of the invention, the air deflection and fairing means being shown in longitudinal median section, Figure 3 is a sectional view taken along the line III—III of Figure 2 to which is added, in part diagrammatically, the actuating and power means of the invention, Figure 4 is an enlarged perspective view showing the inboard sides of the air deflection and fairing means, Figure 5 is a schematic view showing details of the control means and the electrical motor of the actuating means, Figures 6 through 10 are similar sectional views taken along the same plane as Figure 3, the several views progressively showing operation of the air deflection and fairing means in various positions and the behavior of shock waves produced thereby, Figure 11 is a chart in which ramp angle is plotted against Mach number, and Figure 12 is a chart showing thrust losses sustained by a power plant whose air duct does not employ the present invention as contrasted by the smaller losses sustained when the present invention is employed.

Referring now to the drawings, with initial reference to Figure 1, there is shown by way of example, an airplane 20 receiving propulsive thrust from a jet engine 21 mounted in the airplane fuselage 23. A tubular air duct 22 is communicatingly connected at its aft end to the forward end of the engine 21, the duct 22 being firmly and sealingly attached to the engine by means of a clamp 27. From the engine 21, the air duct 22 extends generally forwardly along the fuselage 23 and terminates outside the fuselage 23 at the forwardly directed ram air inlet opening 26 defined by the forwardmost edge or rim 25 of the duct 22 and by a movable ramp 28 of the air deflection means and by a movable fairing means 29 mounted, as will be described, at the inboard side of the duct 22. Although only one engine 21 and duct 22, located generally on and in the left-hand side of the fuselage 23, are shown and described herein, the airplane 20 shown is provided with a second engine and a second air duct therefor which are not shown or further referred to herein, except in general terms, but concerning which it may be understood that they are entirely similar and equivalent to the engine 21 and duct 22, in relation to which they are symmetrically located on and in the right-hand side of the fuselage 23. It will be further understood that the arrangement of the airplane might otherwise be such as to incorporate a single, centrally mounted engine fed by a bifurcate duct with twin inlets symmetrically located in relation to each other and to the airplane center-line, to which the description which follows may generally apply, and that still other engine and duct arrangements employing the present invention are readily possible.

Although the cross-sectional shape of the forward end portion of the air duct 22 may vary in different forms of the invention from the shape herein described, and could, for instance, be circular or semi-curcular, the cross-sectional shape of the duct 22 of the present example is substantially rectangular at the inlet opening 26, this shape affording in a side-mounted inlet a maximum of inlet area for a given width of the duct. Throughout its portions lying outside the contour of the fuselage 23, the duct 22 is surrounded by a fairing or shell 46 which is continuous with the duct 22 at the rim 25, thus conforming exactly thereat with the shape of the duct 22, and which at points away from the rim 25 diverges from the duct 22. The shell 46 has upper, outboard, and lower walls 66, 67, 68 which, aft of the rim 25, progressively become rounded and blendingly merge with the contours of the fuselage 23. The inboard edges of the shell upper and lower walls 66, 68 lie in sealingly close contact with the fuselage skin 54. Aft of its rectangular inlet opening 26, the duct 22 progressively becomes of rounded cross-sectional contour, and at its aft end is circular in cross-section at its juncture with the engine 21 (as at 27) to conform to the cross-sectional shape thereof.

The cut, or form, of the duct 22 at its forward end may vary to suit particular applications. In the present example, the substantially vertical inlet rim portion 39 extending along the forward edge of the outboard wall 67 is continuous with upper and lower transverse rim portions 37, 38 which extend directly inboard along the forward edges of the upper and lower walls 66, 68 and respectively join upper and lower forwardly extending rim portions 47, 48. The forwardly extending rim portions 47, 48 in turn extend diagonally forward from the transverse rim portions 37, 38 to the forward ends of the upper and lower walls 66, 68 near the fuselage 23. The areas of the upper and lower walls 66, 68 lying between the diagonal rim portions 47, 48 and the fuselage 23 are herein designated, according to one of their functions, as upper and lower fixed fairings 44, 45. It may presently be mentioned in connection with the fixed fairings 44, 45 that the ramp 28 is deflectable, being hingedly mounted at its leading edge and movable at its trailing edge through a given interval outwardly from the fuselage 23. The width of the fairings 44, 45 at their forward edges and the slope of the diagonal rims 47, 48 are such that, when the ramp 28 is fully deflected away from the fuselage 23, the diagonal rims 47, 48 are substantially parallel with the ramp 28, and the fixed fairings 44, 45 extend outboard beyond the ramp 28 a distance sufficient for affording adequate fairing of the ramp at its upper and lower edges. In addition to their function as fairings, the fixed fairings 44, 45 add structural strength to the duct 22 and shell 46 and, as will be related, have functions in connection with fuselage boundary layer air disposal, the duct 22 being laterally spaced as will be described at its forward end from the fuselage 23, and the space therebetween including provisions for the disposal of air flowing adjacent the fuselage 23 from points ahead of the inlet opening 26. A boundary layer air inlet opening is shown at 30. A series of boundary layer exhaust openings 31 is shown in the fuselage skin 54 and upper shell wall 66; similar exhaust openings, not shown in Figure 1, are provided beneath the engine air duct 22 in the fuselage skin 54 and lower shell wall 68.

Referring to Figure 2, the engine air duct 22 at its forward end has upper, outboard, and lower walls, 35, 34, 36 enclosed within the corresponding walls 66, 67, 68 of the duct shell 46, and adjacent to the fuselage skin 54 has an inboard wall 49. A hinge half 51 extends along the substantially vertical forward edge of the duct inboard wall 49. The hinge half 51 may be integral with the inboard wall 49, or may be of the kind constituting one leaf of what is ordinarily known as a common double-leaf hinge and rigidly attached to the wall 49 by fasteners 53. From the hinge half 51 to a point near, but aft of, the aftmost boundary layer air exhaust opening 31, the inboard wall 49 extends between and at its upper and lower edges lies in sealingly close contact with the upper and lower shell walls 66, 68. The upper and lower duct walls 35, 36 are continuous with and are connected by the outboard duct wall 34, extend forwardly to a point closely approximating the forward edge of the hinge half 51, and extend inwardly to their juncture with the inboard duct wall 49. At the aft edge of the hinge half 51 and again in its area contacted by the trailing edge 91 of the movable fairing 29 during fore-and-aft movements thereof (to be described), the inboard wall 49 has straight, substantially vertical inner and outer surfaces or sides. Along the portion of the wall 49 lying between the hinge half 51 and the area described as contacted by the trailing edge 91, it will presently be shown that some lateral curvature, that is, curvature along its length toward and away from the fuselage 23, is to be desired; moreover, it is desirable throughout this wall portion to depart from the specified verticality of the wall 49 in such manner that clearance may be obtained for inboard-lying parts of the air deflection and movable fairing means. An elongated opening 57, whose size and location are appropriate for providing clearance for certain actuating means components yet to be described and for components of the ramp 28 and fairing 29 is cut through the duct inboard wall 49 somewhat aft of the hinge half 51 and approximately along the fore-and-aft centerline of the wall 49. Aft of the trailing edge 91, the inboard wall 49 progressively acquires curvature about the duct's longitudinal axis and merges jointly with the three other duct walls 34, 35, 36 into a cylindrical contour such as seen at 22 in Figure 1.

From the hinge half 51 to a point somewhat aft of the aftmost exhaust opening 31, the inboard wall 49 is separated from the fuselage skin 54 by streamlined spacers 33, partition members 64, 65, a plurality of upper and lower vanes 61, 62, and a brace member 56, all rigidly and sealingly attached by appropriate means to the wall 49 and skin 54. The forward ends of the partitions 64, 65 join at a point slightly aft of the hinge half 51 and approximately on the longitudinal centerline of the wall 49. From this location, the upper partition 64 extends upwardly and aft and is rigidly and sealingly attached to the shell upper wall 66 at a point aft of the aftmost upper exhaust opening 31; and the lower partition 65 similarly extends downwardly and aft to its point of rigid, sealed attachment to the shell lower wall 68 aft of the lower exhaust openings 32. The brace member 56 at its respective two ends is rigidly and sealingly attached to the upper and lower partitions 64, 65. The space between the duct inboard wall 49 and the fuselage skin 54 thus contains a bifurcate duct 43 with an upper branch 59 bounded at top and bottom by the shell upper wall 66 and the upper partition 64, and a lower branch 60 similarly bounded by the lower partition 65 and shell lower wall 68. The duct 43 has a forward inlet opening 30, and upper and lower aft exhaust openings 31, 32. Boundary layer air flowing adjacent the fuselage skin 54 and directly forward of the inlet opening 30 enters that opening, is divided into two streams by the upper and lower partitions 64, 65, flows aft through the boundary layer air duct upper and lower branches 59, 60, and is guided overboard through the upper and lower exhaust openings 31, 32 by the vanes 61, 62. Boundary layer air which, because of its reduced relative speed and consequent low energy, would decrease the efficiency of operation of the engine air duct 22, is thus efficiently disposed of and prevented from entering the duct 22.

Although the inboard and outboard sides of the duct inboard wall 49 are in free communication with each other through the clearance opening 57, no free, unhampered flow of air may occur in either direction through that opening. The compartment 58 into which the opening 57 provides entry has no other unstopped opening, and is sealingly bounded by the duct inboard wall 49, fuselage skin 54, brace member 56, and the upper and lower partitions 64, 65. Hence, air passes through the opening 57 only at such times and in such small quantities as may occur in connection with the natural equalization of air pressures within and without the compartment 58. Various deleterious effects, such as diversion and disturbance of airflow through the engine air duct 22, the unwanted entry of air into the fuselage 23, and so on, which conceivably might occur if air were allowed to flow freely between the skin 54 and wall 49 in the space between the two partitions 64, 65, are thus obviated.

The air deflection means, which will now be described, comprises a ramp 28 of rectangular shape and substantially uniform thickness except as will be described. The ramp 28 has a smooth, flat outboard face; its forward vertical edge 70 lies parallel and slightly forward of the hinge half 51; its aft vertical edge 71 is approximately in fore-and-aft alignment with the vertical rim portion 39 (Figure 1), of the engine air duct 22; and its lower horizontal edge 72 and upper horizontal edge (not shown) are parallel with and closely approximate, or lie in smooth sliding contact with, the respective contiguous surfaces of the upper and lower fixed fairings 44, 45 (Figure 1) in such manner that little, if any, air may flow therebetween. Near its forward end, the ramp 28 is pivotally attached, by means to be shown and described, to the hinge half 51 in such manner that it lies in sealingly close contact with the forward end of the duct inboard wall 49 and, in its portion lying forward of the hinge half 51, forms a forwardly directed extension of that wall.

With reference to Figure 4, the ramp 28 comprises a plate 74 to which rigidity is added by a reticulated plurality of vertical and horizontal ribs 77, 78 formed on its inboard surface. The hinge half 79, machined from a rounded vertical rib 77A provided for the purpose near the forward edge 70, affords a means for attachment of the ramp 28 to the hinge half 51 on the duct inboard wall 49. Two parallel arms 80, each with a vertical bolt hole 81 provided near its outer end, the two bolt holes 81 being coaxial, are rigidly attached to the inboard surface of the ramp plate 74 on each side of its fore-and-aft centerline and near its aft end. Forward of the arms 80, two lugs 82 are similarly attached to the inboard surface of the plate 74. Each lug 82 is drilled with a vertical bolt hole 83, these holes being coaxial with each other and with a similar bolt hole 84 drilled in a horizontal rib 78 passing between the two lugs 82. For maximum structural strength, the arms 80 and lugs 82 are rigidly attached to or may be integral with the aft vertical rib 77, and all the ribs 77, 77A, 78 may well be integral with the ramp plate 74. The uppermost and the lowermost of the horizontal ribs 78 are respectively located flush with the upper and lower edges 72, 73 to form a part thereof. The upper and lower edges 72, 73 are thus relatively wide and are finished smooth and flat so that they will lie evenly parallel and in close proximity or even in light sliding contact with the matching, contiguous surfaces of the fixed fairings 44, 45 (Figure 1). To render the ramp forward edge 70 sharp, a flat, smoothly finished bevel 85 is cut in the inboard surface of the ramp along that edge. The plane of the bevel 85 extends obliquely forward from the inboard edge of the hinge half 79 and intersects the outboard surface of the ramp plate 74 at a small, acute angle. Sharpness of the forward edge 70 is thus obtained without disturbing the smooth, plane outboard surface of the ramp plate 74, and is desirable for providing minimum airflow disturbance attributable to the edge 70 and for cleanly dividing the boundary layer airflow from airflow into the engine air duct. Again without disturbing the smooth flatness of the outboard surface of the ramp plate 74, the aft edge 71 is rendered relatively sharp by a smoothly finished surface 87 which is cut along the length of that edge. The surface 87 is similar to the bevel 85, and in the same manner achieves sharpness of the aft edge 71 by the smallness of the angle with which it intersects the outboard surface of the ramp plate 74. The surface 87, however, is not flat, but is dished or curved concavely, and from end to end is of a same arcuate section whose purpose will presently be apparent.

Referring to Figures 2 and 4, the ramp plate hinge half 79 is interlockingly and pivotally attached to the duct wall hinge half 51 by means of the hinge pin 86, which is inserted and by appropriate means retained in coaxial, vertical, matching holes drilled in common, usual fashion in the two hinge halves 51, 79. The ramp 28 thus is pivotable on the hinge pin 86; it is consequently deflectable so that its aft edge may move through a considerable arcuate distance away from or back toward the duct inboard wall 49, while its forward edge 70, traveling at a much smaller radius, moves through a much smaller arc.

The movable fairing means will now be described, with initial reference being made to Figure 2. The rectangular fairing 29 is of substantially even thickness throughout except at its aft end, and is smoothly finished over all its outboard surface. The fairing 29 is flat except, as will be explained, at its forward end or nose portion. Like the ramp 28, the lower horizontal edge 89 and the upper horizontal edge (not shown) of the fairing 29 lie evenly in close approximation to or in smooth sliding contact with the respective adjacent inner surfaces of the duct upper and lower walls 35, 36 in order that little, if any, air may flow therebetween. The fairing aft vertical edge 91 lies at all times in smooth sliding contact with the inboard wall 49; the fairing length is such that when the ramp 28 is extended, air which has passed the ramp aft edge 71 will flow smoothly aft within the duct 22 without experiencing too rapid a change in direction as it expands toward the inboard wall 49. The fairing 29 thus obviates cavitation and turbulence which would otherwise occur aft of the ramp 28, to the detriment of duct efficiency and engine performance. Referring briefly to Figure 3, an arm 93, rigidly attached to the fairing 29 on its inboard side and near the forward end thereof, is so located as to lie between and fall in register with the two arms 80 of the ramp 28. A bolt 94, provided with a suitable nut and with washers not shown, pivotally articulates the fairing arm 93 to the ramp arms 80, the lengths and relative angles of the arms 80, 94 being such that when and as the ramp 28 is deflected to any of its many possible operating positions, the fairing aft edge 91 being meanwhile held in sliding contact with the inboard wall 49, the ramp aft edge 71 remains in close sliding contact with the outboard surface of the fairing 29 as the forward end of the fairing 29 follows the arcuate motion of the ramp 28 to which it is connected as described. It may presently be mentioned that the nose of the fairing 29 is curved for extending inboard and forward of the ramp aft edge 71, which rides closely upon the curved nose of the fairing 29 at all times.

Referring again to Figure 2, the means for mounting the fairing 29 near its aft end and for holding it, at its aft edge 91, in close sliding contact with the inboard wall 49 includes similar upper and lower mounting links 95, symmetrically and pivotally attached at their inboard ends by fairing pins or studs (to be shown and described) to upper and lower edges of the fairing 29 at matching points lying a short distance forward of the aft edge 91, the two links 95 being respectively and pivotally mounted by means of pivot bolts 96 and nuts 97 on elongated, similar, upper and lower reinforcing members 98 which preferably are of U-shaped cross-section. The upper reinforcing member 98 is rigidly attached between the upper shell wall 66 and the upper duct wall 35 by fasteners 99 which preferably have countersunk heads at least at their ends extending through the duct and shell walls 35, 66. The lower reinforcing member 98 is similarly attached between the duct lower wall 36 and shell lower wall 68. The two pivot bolts 96 lie somewhat forward and outboard of the points of connection at their inboard ends of the two links 95 to the lower edge 89 and upper edge (not shown) of the fairing 29, which respective edges lie very near or slidingly in contact with the upper and lower walls 35, 36. Consequently, the lower link 95 must pass between the fairing lower edge 90 and the adjacent wall 36, while the upper link 95 must similarly pass between the fairing upper edge (not shown) and the wall 36; hence, provision must be made for furnishing sufficient clearance between the said links, edges, and walls to allow for free, non-binding pivoting of the links on their respective bolts 96. Such clearance may be provided in several ways, a preferred one of which consists of dishing or recessing to appropriate depth the duct walls 35, 36 as for example shown at 100, the corresponding surfaces of the reinforcing members 98 being similarly and matchingly dished or recessed as at 101. The links 95 thus lie substantially flush with the inner surfaces of the duct walls 35, 36. The links 95 pivot at their respective outboard ends on the bolts 96 so that their inboard ends, attached to the fairing 29, move forward and aft along a relatively short arcuate path when the ramp 28 and cooperating fairing 29 are extended and retracted. The areas over which the links 95 travel are thus wedge-shaped in outline, their apexes being near the respective pivot bolts 96, and their bases being represented by the arcs travelled by the inboard ends of the links 95. The recesses 100, 101 are respectively of proper size and shape for fully including the above-described areas without providing more room for pivoting of the links 95 than is necessary.

Continuing the description of the movable fairing means, and with reference to Figure 4, the fairing 29 comprises a plate 88 which has a plurality of reticulated vertical and horizontal ribs 102, 103 formed on its inboard surface and preferably integral therewith, the uppermost and lowermost horizontal ribs 103C being respectively flush with and forming part of the upper and lower fairing edges 89, 90, and other horizontal ribs being symmetrically disposed therebetween, one of which, rib 103A, extends along the fore-and-aft centerline of the plate 88. To add structural strength for bearing the strain placed on the plate 88 at its centerline by loads transmitted through the arm 93, the ribs 103B and 103A are progressively wider in their extension from the plate 88 than the edge ribs 103C. The relatively wide upper and lower edges 89, 90, are finished flat and smooth so that they may lie evenly parallel with the upper and lower walls 35, 36. The arm 93, described above as articulating with the ramp arms 80, is rigidly attached to the centerline rib 103A, or preferably is integral with that rib and with the intersecting forward vertical rib 102A. In its inboard end the arm 93 has a vertical hole 104 for reception of a bolt 94 (Figure 3) articulating the fairing 29 with the ramp 28. Forward of the fairing aft edge (91) and suitably positioned on the upper and lower edges 89, 90 for engaging suitable holes in the inboard ends of the mounting links 95, 95A (Figure 2) are an upper pin 105 and a similar lower pin 105A which may be formed integrally with the fairing 29, or which may take the form of studs threadingly or otherwise attached in suitable holes drilled vertically through the upper and lower edges 89, 90 into enlargements 106 provided at the ends of a vertical rib 102B located approximately in fore-and-aft alignment with the pins 105, 105A. At its nose 106, the outboard and inboard surfaces of the fairing plate 88 curve concentrically inboard, the nose portion 106 thus forming in effect a lengthwise sectional portion of a vertically disposed cylinder whose curvature closely matches the curvature of the previously described surface 87 at the ramp aft edge 71, with which the nose portion 106 lies concentric and in close contact when the ramp 28 and fairing 29 are mounted as previously described. Along its aft edge, the fairing plate 88 has on its inboard surface a thickened portion 107 with a smoothly finished concave surface 108. The surface 108 has a same, uniformly arcuate cross-sectional contour at all points along the length of the thickened portion 107, and smoothly blends into the outboard surface of the fairing plate 88 at the fairing aft edge 91, thus rendering the edge 91 relatively sharp.

Referring to Figure 3, the ramp 28 and fairing 29 are shown in their fully extended position wherein the fixed fairing rim 47 is substantially parallel with and extends only slightly outboard of the ramp 28. To provide clearance for the thicknesses of the ramp 28 and fairing 29, the duct inboard wall 49 curves inboard commencing at a point substantially even with the aft edge 91 of the fairing 29 and continues to have some inward curvature from that point forward to about the aft edge of the clearance hole 57. From this point, the inboard wall 49 curves again outwardly in such manner that the ramp forward edge 70 extending ahead of the forward end of the wall 49 lies in about the same plane which it would occupy if the edge 70 were continuous with the wall 49 and that wall were completely straight from the fairing aft edge 91 forward. To provide ample room for the boundary layer air duct 43 between the wall 49 and fuselage skin 54, the skin 54 follows a curved course from slightly aft of the fairing aft edge 91 to a point slightly aft of the ramp forward edge 70 in such manner that, as seen in median longitudinal section through the wall 49, the skin 54 and wall 49 are evenly spaced from each other throughout the just-described curved areas by the spacer vanes 33, upper and lower partitions 64, 65, and the brace member 56, and as described previously, by upper and lower deflector vanes 61, 62 (Figure 2). The duct wall 49 is also curved about its longitudinal axis between the fairing aft edge 91 and the clearance opening 57, this second curvature being made in a manner appropriate for affording extra clearance for the larger horizontal ribs 103B and 103A (Figure 4) of the fairing 29 which are progressively thicker than the edge ribs 103C. The fuselage skin profile generally follows also this second curvature where applicable in order to provide ample room for the boundary layer air duct 43.

The curvature of the area 112 of the wall 49 contacted by the fairing aft edge 91 throughout its range of travel, presently to be described, is preferably made to correspond closely with the curvature of the contacting surface 108 (Figure 4) of the fairing 29. When fully retracted, as may be seen in Figure 10, the ramp 28 and fairing 29 lie substantially flat and flush with the duct wall 49. In deflection to the fully extended position shown in Figure 3, and in all positions therebetween, as well as in the fully retracted position of the ramp 28 and fairing 29, the convex area 112 of the duct wall 49 is snugly contacted by the concave end surface 108 (Figure 4) of the fairing 29, and similar contact is maintained by the convex nose portion 106 of the fairing 29 and the concave end surface 87 (Figure 4) of the ramp 28. It should be noted on Figure 3 that the ramp 28 is pivoted on the hinge pin 86 and articulated at its arms 80 by the bolt 94 to the arm 93 of the fairing 29, the fairing 29 being swingingly mounted as described on the duct wall 49 by the links. As the ramp 28 is deflected to its fully retracted position, the bolt 94 moves from the point shown to the point 113, and, in so moving, the bolt 94 moves somewhat forward as well as inboard. Consequently, the fairing 29 changes its angular relationship to the duct wall 49 as well as to the ramp 38, being rotated in an inboard direction at its forward end, and at the same time moves forward and inboard a relatively short distance along an arc travelled by the inboard end of the fairing mounting links 95, 95A. The curvatures of the area 112 of the wall 49 and of the fairing nose 106 are made so that, when the ramp 28 and fairing 29 are fully retracted, the sharp aft edge 71 of the ramp is at the aft limit of the curve of the nose 106, and the ramp 28 and fairing 29 thus present in effect a continuous flat surface, while the fairing's sharp aft edge lies in close contact with the duct wall 49 only a little way forward of the aft beginning-point of the curve of the area 112. When the ramp 28 and fairing 29 are fully extended, the fairing aft edge lies at the aft beginning-point of the curve of the area 112, and the aft edge of the ramp lies on the curve of the nose 106. The ramp 28, fairing 29, and wall 49 thus present at all times a smooth, in effect continuous, outboard surface. The point of smallest diameter, or throat, of the engine air duct 22 is seen to be, in all positions of the ramp 28 and fairing 29, at its lateral and vertical rims 37, 39, the duct outboard wall 34 having a slight inward curvature from a point near its forward edge to its rim 39. This throat is restricted in varying degrees by extension of the ramp 28 and fairing 29 to their various positions away from their retracted position, the effect of the consequent reduction of flow area of the inlet being much more than offset at supersonic speeds by the increased efficiency of the inlet brought about by the aerodynamic effects of the properly extended ramp 28 and fairing 29, as will presently be seen.

With reference to Figures 2 and 3, the actuating means will now be described. The actuating means comprises a reversible motor 127 for furnishing the mechanical power required for varying the positions of the ramp 28 and fairing 29, and mechanical linking and motion-transforming means for receiving rotary motion originating at the motor and changing it first to linear and finally to arcuate motion, in which latter form the motion is transmitted to the ramp 28 for positioning the latter and the fairing 29. The mechanical linking and motion-transforming means comprises an actuator arm 111, nut 117, shafts 109, 124, and 129, and gears 123, 125, 126, and 128. The threaded shaft 109 extends rearwardly and diagonally outward from the interior of the fuselage 23 into the clearance compartment 58, is rotatably supported at its point of egress from the fuselage 23 into the compartment 58 by a bearing member 114, and is similarly supported at its aft end by a bearing 115 carried by the outboard end of a support 110. The support 110 is rigidly attached by fasteners 116 to structure of the fuselage 23, and similar provisions are made for the rigid mounting of the bearing member 114 to fuselage structure. The bearing member 114 is packed and sealed by suitable means for preventing leakage of air through the fuselage skin 54 at or through the member 114. A threaded nut 117 is mounted on the shaft 109, the female threads thereof being in engagement with male threads 118 formed on the shaft 109 on its surface lying between the bearings 114, 115. While the shaft 109 is rotatable in the nut 117, the nut is prevented from rotating therewith by the actuator arm 111 which is pivotally engaged at its bifurcate inboard end by an oppositely disposed pair of journals (not shown) which are integral with the nut 117, and normal to the shaft 109. These journals are pivotally and respectively engaged within the lower journal box 121 and an oppositely disposed upper journal box (not shown) on the inboard end of the arm 111. The arm 111 extends outboard from the nut 117 through the clearance hole 57, and is pivotally connected at its bifurcate outboard end to the ramp 28 by a bolt 120 which passes through aligned vertical holes in the outboard end of the arm 111 and through the previously described holes 83, 84 (Figure 4) in the ramp. The lower end of the arm 111 may be fashioned for assembly to the journals of the nut 117 by any of several well-known methods, as may be convenient; in the preferred embodiment, the lower prong 122 of the inboard-end bifurcation of the arm 111 is made as a separate piece bearing the lower journal box 121, and is rigidly joined to the main body of the arm 111 after the lower journal box 121 and matching upper journal box have been engaged with the respective journals of the nut 117.

The shaft 109 being rotatably mounted in fixed alignment on fuselage structure by the bearing member 114, support 110, and end bearing 115, rotation of the shaft 109 is accompanied by endwise movement of the nut 117 along the shaft threaded portion 118, the direction of movement being dependent on the direction of rotation of the shaft 109. Aft movement of the nut 117 swings the actuator arm 111 aft at its end connected to the nut 117, bringing the arm 111 into a position more nearly normal to the longitudinal centerline of the fuselage 23. At the same time, the nut 117 moves outboard along the shaft 109, thus also moving the entire arm 111 somewhat outboard. The two motions thus imparted to the arm 111 by aft movement of the nut 117 have a similar, cumulative effect in that they both cause arcuate movement in an outboard direction of the arm 111 at the ramp-connecting bolt 120. Constrained to move with the bolt 120, the ramp 28 is thus deflected outwardly, along with the fairing 29 to which it is connected, when the nut 117 is moved forward. An opposite rotation of the shaft 109 is accompanied by forward motion of the nut 117 and corresponding inward deflection of the ramp 28 and fairing 29. The shaft 109 is shown as broken away through part of its length to indicate that it may extend for any convenient distance diagonally inboard into the fuselage 23, as may best suit the interior dimensions thereof and the disposition of other equipment therein. Besides the bearings 114, 115, no other bearings are shown for the shaft 109, and it should be understood that such should be provided near the inboard end of the shaft 109 and in other locations along its length as may be required for its adequate support.

The alignment of the shaft 109, bearing member 114, and end bearing 115 relative to the centerline of the fuselage 23, and the geometry of the actuator arm 111 and ramp 28, are such that the ramp 28 reaches its fully extended position when the nut 117 is near, but not having struck, the end bearing 115. Similarly, the ramp 28 reaches its fully retracted position when the nut 117 is still a little distance separated from the bearing member 114. The support 110, which may extend slightly outboard through the clearance hole 57, is of such dimensions as not to interfere with the arm 111 as the ramp 28 reaches its fully retracted position. Rotary motion is transmitted to the shaft 109 from an electrically driven reversible motor 127 through a bevel gear 123 mounted on the shaft 109 at its inboard end, a second shaft 124, a bevel gear 125 mounted on the shaft 124 and enmeshed with the gear 123, a bevel gear 126 mounted on the shaft 124 at a point between its two ends, and a bevel gear 128 enmeshed with the gear 126 and drivingly mounted on the protruding end of the motor shaft 129, all the gears 123, 125, 126, 128 being rigidly mounted upon their respective shafts. No bearings or supports are shown for the shaft 124 or motor 127 and it is to be understood that, as expedient, such must be provided, the manner of providing such bearings and supports being well known in the art, and requiring no explanation herein. The shaft 124 extends inboard generally transversely of the fuselage 23 to the reversible motor 127, and from the motor extends toward the right-hand side of the fuselage 23. The right-hand extension 130 of the shaft 124 is shown broken away. It should be understood that the extension 130 is made as long as is required for transmitting rotary motion from the motor 127 to a second threaded shaft, nut, and actuator arm which are similar to the shaft, nut, and arm 109, 117 and 111 and are symmetrically disposed in relation thereto on the opposite, or right-hand, side of the fuselage 23, each of these right-hand items being mounted in the same way as the corresponding item located on the left-hand side of the fuselage, and, in connection with the right-hand ramp and movable fairing, simultaneously serving the same purpose. The shaft 124 is shown as having a broken-away segment between its left-hand end and the motor 127 to indicate that it may be of any convenient length which will vary with the location decided upon as most desirable for the motor 127 within the fuselage 23. As the right-hand components of the actuator means are each similar and equivalent to the corresponding left-hand components herein described in detail, no further description beyond the above is made of them except to specify that, as they are mutually directly interconnected by the shaft 124 and its extension 130, and having the same ratios as to their gears, threads, and so on, they operate for extending or retracting the ramp and movable fairing on the right-hand side of the airplane in complete synchronization with and through the same angular displacement as those on the left-hand side. Where desirable in a particular application, of course, the right-hand ramp and fairing may be provided with separate, independent actuating and control means.

The motor 127 should be of suitable power output and internal gear ratio for driving the actuating means components at desirable speeds for securing sufficiently prompt adjustment of the ramp 28 and fairing 29 during the imposition, in flight, of relatively heavy aerodynamic loads on those parts. The motor further should be of the well-known sort containing a pair of limit switches, or suitable limit switches therefor must be provided externally thereof, such switches being useful and necessary for stopping the motor 127, and hence the threaded shaft 109, before the nut 117 has exceeded its proper range of travel toward either the bearing 114 or the bearing 115 in order that possible damage to the ramp 28, fairing 29, and the actuating means from operation of the actuating means components beyond their proper range will not occur.

With reference to Figures 3 and 5, the control means, shown diagrammatically on those figures, comprises a machmeter-regulated potentiometer 132, servo amplifier 133, and follow-up potentiometer 134 interconnected by cables 135; also a machmeter 131 connected by a mechanical linkage 140 to the potentiometer 132 for constantly positioning the wiper element of the latter in accordance with the flight Mach number of the aircraft. The follow-up potentiometer 134 is conveniently mounted on the motor 127 and its wiper element is driven by the motor 127 through siutable reduction gears, though the potentiometer may readily be otherwise located and its wiper may be connected with other actuating means components, or with the ramp 28 or fairing 29, for producing an electrical signal which is at all times an analogue of the relative angular position of the ramp 28. The linkage 140 may be fashioned in any one of several well-known modes, and as, beyond the fact of its specific use as herein pointed out, the linkage 140 forms no part of what is claimed herein as inventive, it will receive no further description as to its physical aspects, necessary operational description thereof being given below.

With reference now to Figure 5, the potentiometers 132 and 134 are each, at their respective opposite ends, connected to and receive electrical current and voltage from the power supply 141. The wiper contact 142 of the machmeter-actuated potentiometer 132 is electrically connected to the servo amplifier 133, and is mechanically connected by the linkage 140 to the machmeter 131, being moved through the linkage 140 by the machmeter 131 in proportion with the Mach number sensings and indications thereof, whereby a signal is delivered to the servo amplifier 133 which varies with and at all times is proportional to the flight Mach number as sensed by the machmeter. The wiper contact 143 of the follow-up potentiometer 134 is mechanically connected as at 151 to the motor 127 and is moved thereby to positions corresponding at all times to the position of the ramp 28, to which the motor 127 is connected by previously described actuating means components collectively designated on Figure 5 as 144. The wiper contact 143 is electrically connected to the servo amplifier 133, and supplies a continuous signal to the servo amplifier which is at all times an analogue of the relative position of the ramp 28. The servo amplifier 133 responds not merely to the voltage of the signal delivered to it from either one or the other wiper contact 142, 143, but is constructed, in a manner which is usual and conventional and therefore is not described in detail, to respond instead to the voltage differential existing at any particular time between the wiper contacts 142, 143. The servo amplifier is supplied with alternating current from the supply circuit 145. The signal emitted by the machmeter-actuated wiper contact 142 is analogous to the Mach number of flight, and hence, as will be seen, is for practical purposes directly analoguous to the proper angle of deflection, for maximum duct efficiency, of the ramp 28 from its fully retracted position wherein it is substantially parallel with the aircraft centerline. The signal from the follow-up potentiometer wiper 143 is directly analogous to actual ramp position.

Thus, when the supersonic flight Mach number of the aircraft is constant and the ramp 28 is at its deflection angle proper for such Mach number, the voltage of the signal from the wiper contact 142 is analogous to that particular Mach number. The ramp 28, already being in its proper position, however, the signal emitted from the other wiper contact 143 is also analogous in voltage to Mach number, and is equal to the signal voltage from the wiper contact 142. There being no voltage difference between the two signals, the servo amplifier 133 makes no response tending to change the ramp's position. If the flight Mach number changes to a higher value, such fact is sensed by the machmeter which, through the linkage 140, effects a corresponding change in the position of the wiper contact 142, accompanied by a corresponding rise in signal voltage emitted from the latter. The signal voltage from the wiper contact 143 not having changed, a voltage differential exists between the two signals, that from the wiper contact 142 being the higher. In response to this differential, the servo amplifier 133 delivers electrical power to the motor 127 for causing the latter to move the ramp 28, through the actuating means components 144, toward its position proper to the new speed of flight. As the ramp 28 moves, the follow-up wiper contact 143 is moved in synchronization therewith in a direction tending to increase the signal voltage from that contact. As the ramp 28 reaches its proper position, the voltages of the two signals become equal, and the servo amplifier ceases to deliver electrical power to the motor 127, which thereupon stops, leaving the ramp set in its proper position. When the aircraft is negatively accelerated to a lower speed, the machmeter moves the wiper 142 to a position wherein a voltage differential again exists between the two signals, that from the follow-up potentiometer wiper contact 143 in this case being the higher. The servo amplifier 133 responds by furnishing electrical power for operating the motor 127 in a reverse direction, thus deflecting the ramp 28 to its angle proper for the new, lower Mach number. Again, as the new angle is reached, the wiper contact 143 reaches a position wherein the voltage differential between the two control signals becomes zero, electrical power ceases to flow to the motor 127 from the servo amplifier 133, and the ramp 28 is stopped in correct position. As the response of the actuating means, including the motor 127, is prompt, the ramp 28 closely follows, in its changes of position, the changes in flight Mach number of the aircraft, and thus at all times is in substantially its best position for effecting optimum static pressure recovery within the engine air duct with which it is associated.

The mode of operation of the shock wave inducing apparatus will now be described. Considerable operational information has been given above in connection with the descriptions of the various components of the invention; such information is not hereinafter repeated, except by way of summary where such may be helpful.

Figure 6:
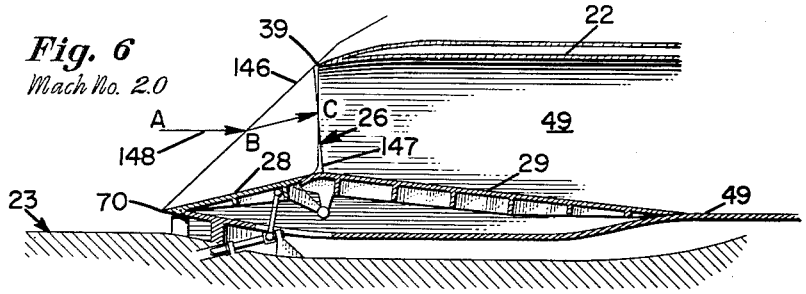

With reference to Figures 5–11, with initial attention directed particularly to Figure 6, let it be assumed that the airplane embodying the present invention is accelerated to Mach 2.0 from a lower relative speed, and that thereafter the Mach number of the airplane for some time remains constant. During the time of acceleration, the machmeter 131 continuously senses the increasing Mach number values, and in response thereto continuously varies the Mach number potentiometer wiper 142 position in such direction and amount as to cause a corresponding change in the signal voltage emitted by that wiper, producing a voltage differential between that signal and the signal emitted by the follow-up potentiometer 143 and resulting, as previously explained, in outward deflection of the ramp 28 toward its position most beneficial to efficiency of operation of the duct 22 at the Mach number specified. The ramp 28 having arrived at that position, the two signal voltages become equalized, and the motor 127 stops, leaving the ramp 28 in its correct position for the specified speed of flight. In addition, a limit switch, previously mentioned in connection with the motor 127, opens and cuts off electrical power for driving the motor in a direction for deflecting the ramp outwardly, the ramp having arrived at the outer limit of its range of travel as applied to the present embodiment of the invention.

Although not limited in its usefulness by extremely high Mach numbers, being of utility in aircraft of any range of supersonic speed, it will be helpful to assume herein, for purposes of illustration, a particular maximum speed of the specifically described aircraft. For this purpose, it may conveniently be assumed that the aircraft has a normal top speed of Mach 2.0. Such assumption being made, it is nevertheless entirely conceivable that an appropriate combination of speed-affecting conditions may occur which may be accompanied by acceleration of the airplane to a speed above Mach 2.0. In such cases, a voltage differential tending to effect further outward deflection of the ramp 28 will exist between the two control signals supplied to the servo amplifier 133, and the servo amplifier will respond by emitting electrical power for the motor 127. The limit switch being open, however, the motor will receive no electrical power, and the ramp accordingly will receive no actuating forces tending to drive it beyond its outward range of travel.

Consideration of the shock wave pattern induced by the ramp and movable fairing will now be initiated. Assuming a return of the airplane to a constant speed of Mach 2.0, the ramp remains at its already attained angle appropriate for such speed, and an oblique shock wave 146, which originates at the ramp forward edge 70 and extends diagonally aft and outboard therefrom, stands ahead of the inlet opening 26. At the same time, a normal shock wave 147 stands across or very near the inlet vertical rim portion 39. At this Mach number and ramp deflection angle, the oblique shock wave 146 is swept back to the rear until it lies approximately in contact with the rim portion 39. The path of air entering the inlet opening 26 is illustrated by the arrows 148. At the point A, air flows in the direction shown and at a speed of Mach 2.0 relative to the duct 22. At the point B, within the thickness of the oblique shock wave 146, the airflow changes direction as shown and is decelerated to a lower supersonic velocity, its flow direction, between the points B and C, being parallel to the ramp 28. At the point C, the airflow passes through the normal shock wave 147 wherein its speed becomes subsonic relative to the duct 22, and its flow, being subsonic, becomes more complex, but in general is in an aft direction, with such expansion of the air occurring as required for filling and following the duct. The streamtube of air passing through the normal shock wave 147 lies, at its inboard side, somewhat outboard of the duct wall 49 next to the fuselage 23. The air, as it expands within the duct toward the wall 49, is guided along a smooth, uneventful flow path by the movable fairing 29. In comparison to the entropy change which would be sustained by the air if it were passed through a single, severe normal shock wave before entry into the duct 22, the air, having passed through the shock wave pattern 146, 147 experiences only a small entropy change, little if any subsonic air spills outside the inlet opening 26, turbulence occasioned by the air induction process is minimized both inside and outside the duct 22, and the static pressure recovery ratio within the duct 22 is relatively very high.

Although for purposes of clarity described herein as separate units, the ramp 28 of the air deflection means on the one hand and the fairing means 29 on the other are thus seen to cooperate in such synchronization and unity of purpose, namely the governing of airflow direction in the streamtube of air approaching and just having entered the ram air inlet opening 26, the shock waves produced thereby at supersonic speeds being most favorable for high efficiency of the associated air duct, that the two considered together constitute a unified and effective airflow-governing means. As regards the best angle of the ramp 28 for optimum duct efficiency at a given supersonic speed, momentary reference is made to Figure 11 summarizing the results of experiments which have shown that, above Mach 1.0, the proper ramp angle varies in substantially linear fashion with Mach number. Thus, at Mach 2.0, the correct ramp angle is about 14 degrees from a plane parallel to the airplane's centerline. It should be noted, as an aid to understanding Figures 7–10, that the proper ramp angle at Mach 1.8 is about 11.2 degrees, while the ramp angle should be near 7.0 degrees at Mach 1.5, and should be 4.2 degrees at Mach 1.3. At Mach 1.0 and below, the ramp angle should be zero.

Figure 7:
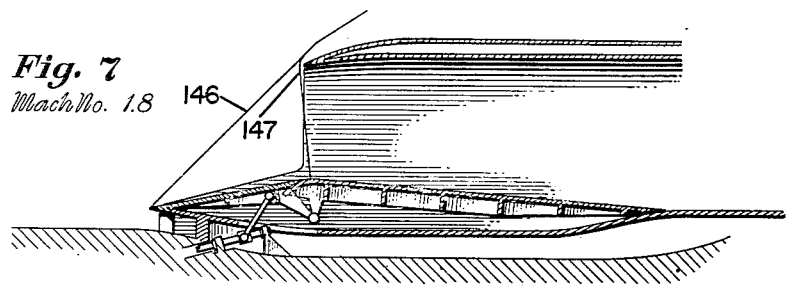
Figure 8:
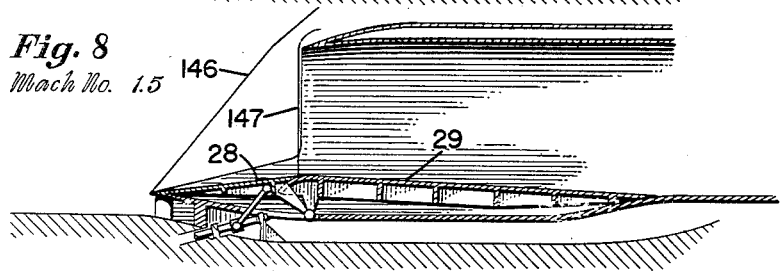
Figure 9:
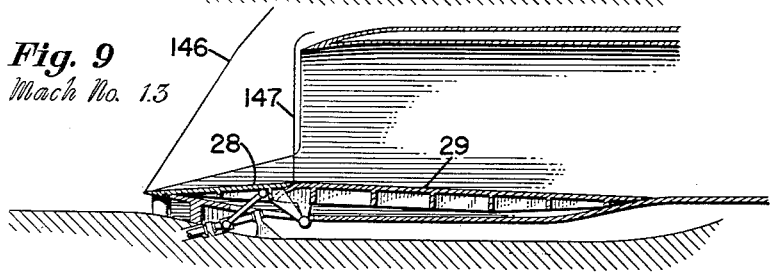
Figure 10:
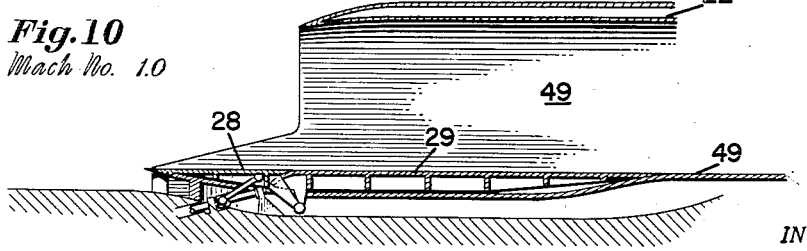

With reference to Figure 7 and assuming the speed of the airplane to be reduced to Mach 1.8, the control and actuating means cooperatively reposition the ramp, in a manner previously described, to its proper angle for that speed, and the ramp engenders an oblique shock wave 146 which is swept back less sharply than was the case at Mach 2.0. The normal shock wave 147 persists near the rim portion 39. The ramp angle may be seen to be progressively reduced as the airplane is flown at still lower Mach numbers, such as Mach 1.5 (Figure 8) and Mach 1.3 (Figure 9), and the oblique shock wave 146 is meanwhile swept back less and less sharply until, at Mach 1.0 (Figure 10), the ramp is fully retracted to an angle of zero, and the oblique shock wave, as such, no longer exists. The normal shock wave 147 persists in the area of the rim 39 until the speed reaches Mach 1.0, when it disappears.

At Mach 1.0, the ramp 28 being fully retracted, the previously explained limit switch provisions of the motor 127 are actuated as described so as to prevent energization of the motor for effecting further retraction of the ramp 28 and fairing 29. Thus, at subsonic speeds, the servo amplifier 133 receives control signals to which it responds by supplying electrical power which, if received by the motor 127, would cause further retracting forces to be placed on the ramp 28 but which is prevented from flowing to the motor by the limit switch, which remains open at all speeds below Mach 1.0. Lying parallel to the airplane centerline and in effect forming an extension of the duct wall 49, the fully retracted ramp 28 and fairing 29 impose no added drag on the aircraft and do not in any way interfere with efficient subsonic operation of the engine air duct 22.

With reference to Figure 12, the extent of the thrust loss sustained, because of entropy losses in air entering the engine air duct, by a typical turbojet engine during supersonic flight, is disadvantageously large when the inlet of the duct is not provided with the shock wave inducing and controlling apparatus of the present invention. The magnitudes of such losses at various supersonic Mach numbers are shown by curve 149. Plotted against these values and shown by the curve 150 are the thrust losses sustained by the same engine while receiving its air supply by the same duct, but with the shock wave inducing and controlling apparatus operatively installed. It will be seen that in low-speed supersonic flight, the thrust loss is the same in both cases at Mach 1.0, but that as Mach number increases, curve 149 rises sharply, while the curve 150 rises much less rapidly. Thus, at about Mach 1.52, thrust loss shown on curve 149 is 17.5%, while on curve 150 it is only about 12.5%. Nearly 30% thrust loss is shown on curve 149 at Mach 1.75, while loss is only about 16.35% at the same Mach number on curve 150; and at Mach 2.0, the thrust loss along curve 150 is only about 22.6%, which is no greater than the corresponding loss shown on curve 149 at the much lower speed of Mach 1.63.

While only one embodiment of the invention has been shown in the accompanying drawings, it will be evident that various modifications will be possible in the arrangement and construction of the shock wave inducing and controlling apparatus components without departing from the scope of the invention.

We claim:

1. For an airframe-housed power plant of an aircraft, an air induction device comprising: an air duct on said aircraft communicating with said power plant and having a sidewall and a ram inlet opening; a variable-position airflow-deflecting body mounted forwardly of said opening on said aircraft for controlling airflow adjacent said opening, said body being pivotable, about a point longitudinally fixed relative to said aircraft and to said body, to a position wherein it is substantially in register with said sidewall of said duct and freely allows ram airflow into said inlet opening; actuating means mounted in said aircraft and operably connected to said airflow-deflecting body for pivoting the same; and control means continuously responsive to the position of said airflow-deflecting body and to Mach number of said aircraft and connected to a power source and to said actuating means for energizing the latter in accordance with such Mach number in a manner wherein said airflow-deflecting body is pivoted by said actuating means to its position most favorable for high pressure recovery in said duct and high mass-flow of air through said ram inlet opening.

2. An air induction device of the type claimed in claim 1 wherein said actuating means comprises linear actuator means for moving said airflow-deflecting body.

3. An air induction device of the type claimed in claim 1, said point longitudinally fixed relative to said aircraft and to said body being located substantially in alignment with a sidewall of said air duct.

4. For an airframe-housed power plant of an aircraft, an air induction device comprising: an air duct on said aircraft communicating with said power plant and having a sidewall and a ram inlet opening; a variable-position airflow-deflecting body mounted forwardly of said opening on said aircraft for controlling airflow adjacent said opening, said body being pivotable, about a point longitudinally fixed relative to said aircraft and to said body, to a position wherein it is substantially in register with said sidewall of said duct and freely allows ram airflow into said inlet opening; actuating means mounted in said aircraft and comprising a linear actuator operably connected to said airflow-deflecting body and further comprising motor means drivingly connected to said linear actuator for effecting movement of said airflow-deflecting body thereby; control means connected to a power source for receiving power therefrom and operably connected to said actuating means, said control means containing elements continuously responsive to aircraft Mach number and position of said airflow-deflecting body for energization of said actuating means in accordance therewith in a manner wherein said airflow-deflecting body is moved by said actuating means to its position most favorable for high pressure recovery in said duct and high mass-flow of air through said ram inlet opening.

5. For an airframe-housed power plant of an aircraft, an air induction device comprising: an air duct on said aircraft communicating with said power plant and having a ram inlet opening; a variable-position airflow-governing means having a forward edge pivotally mounted on said aircraft forward of said inlet opening and having an aft edge movably mounted in said air duct; actuating means mounted in said aircraft and operably connected to said airflow-governing means for moving the same; control means continuously responsive to the position of said airflow-governing means and to Mach number of said aircraft and connected to a power source and to said actuating means for energizing the latter in accordance with Mach number of said aircraft and the position of said airflow-governing means in a manner such that said airflow-governing means is moved by said actuating means to its position most favorable to high pressure recovery in said duct and high mass-flow of air through said ram inlet opening, said control means having an element continuously responsive solely to Mach number of said aircraft and another element continuously responsive solely to the position of said airflow-governing means.

6. An air induction device of the type claimed in claim 5 wherein said air duct has a wall having an interior surface provided with a recess for receiving said airflow-governing means, the latter being at least in part retractable thereinto.

7. For a power plant of an aircraft, an air induction device comprising: an air duct on said aircraft communicating with said power plant and having a ram inlet opening; a variable-position airflow-governing means having a forward edge pivotally mounted on said aircraft forward of said inlet opening and having an aft edge movably mounted in said air duct; actuating means mounted in said aircraft and operably connected to said airflow-governing means for moving the same; control means connected to a power source for receiving power therefrom and operably connected to said actuating means, said control means being continuously responsive to aircraft Mach number and position of said airflow-governing means for energizing said actuating means in accordance therewith in a manner of such character that said airflow-governing means is moved by said actuating means to its position most favorable to high pressure recovery in said duct and high mass-flow of air through said ram inlet opening, said control means having an element continuously responsive solely to Mach number of said aircraft and another element continuously responsive solely to the position of said airflow-governing means.

8. An air induction device of the type claimed in claim 7 wherein said actuating means comprises a linear actuator connected to said airflow-governing means and further comprises motor means drivingly connected to said linear actuator for effecting movement of said airflow governing means.

9. For a power plant of an aircraft, an air induction device comprising: an air duct on said aircraft communicating with said power plant and having a ram inlet opening, said duct having a wall having an interior surface provided with a recess; a variable-position airflow-governing means having a forward edge pivotally mounted forward of said ram inlet opening on a fixed member of said aircraft and having an aft edge movably mounted in said air duct, said airflow-governing means being retractable into said recess for lying substantially flush with an interior wall surface of said duct and being extendible from said recess toward the longitudinal axis of said duct; actuating means mounted in said aircraft and operably connected to said airflow-governing means for moving the same; and control means continuously responsive to Mach number of said aircraft and the position of said airflow-governing means, said control means being connected to a power source and to said actuating means for energizing the latter in accordance with Mach number and the position of said airflow-governing means in a manner wherein said airflow-governing means is moved by said actuating means to its position most favorable for high pressure recovery in said duct and high mass-flow of air through said ram inlet opening, said control means having an element continuously and solely responsive to Mach number of said aircraft and another element continuously and solely responsive to the position of said airflow-governing means.

10. An air induction device of the type claimed in claim 9, said actuating means comprising a linear actuator connected to said airflow-governing means and further comprising motor means drivingly connected to said linear actuator for effecting movement of said airflow governing means.

11. For a power plant of an aircraft, an air induction device comprising: an air duct on said aircraft communicating with said power plant and having a ram inlet opening, said duct having a recess formed in an interior wall surface thereof; a variable-position airflow-governing means having a forward edge pivotally mounted on said aircraft forward of said ram inlet opening and having an aft edge movably mounted in said air duct; said airflow-governing means being adapted for flexure in an area between its two ends for effecting inward sloping thereof, relative to the longitudinal axis of said duct at said ram inlet opening from said forward edge to said flexure area and outward sloping thereof relative to the longitudinal axis of said duct at said ram air inlet opening, aft of said flexure area, said flexure area lying substantially in register with said inlet opening, said airflow-governing means being further adapted for flexure in said flexure area for movement to a position wherein said airflow-governing means is at least in part retracted into said duct wall recess and lies substantially flush with an interior surface of a wall of said duct; actuating means mounted in said aircraft comprising a linear actuator operably connected to said airflow-governing means and comprising motor means connected to said linear actuator for driving the latter and thereby effecting movement of said airflow-governing means; and control means connected to a power source for receiving power therefrom and operably connected to said actuating means, said control means containing elements continuously responsive to discrepancies between aircraft Mach number and position of said airflow-governing means for energization of said actuating means in accordance with said discrepancies in a manner wherein said airflow-governing means is moved to its position most favorable for high pressure recovery in said duct and for high mass-flow of air through said ram inlet opening.

12. An air induction device of the type claimed in claim 1, said airflow-deflecting body having a leading edge freely exposed to airflow ahead of said ram inlet opening.

13. An air induction device of the type claimed in claim 1, said ram inlet opening being substantially of rectangular shape.

14. An air induction device such as claimed in claim 5, said airflow-governing means comprising a forward body lying substantially forwardly of said inlet opening and a rearward body lying substantially in said duct; said device further comprising means articulating said forward body with said rearward body in a location substantially in register with said inlet opening.

References Cited in the file of this patent

UNITED STATES PATENTS

| | | |
|---|---|---|
| 2,570,847 | Ovens | Oct. 9, 1951 |
| 2,596,435 | Robert | May 13, 1952 |
| 2,638,738 | Salter | May 19, 1953 |
| 2,776,806 | Brendal | Jan. 8, 1957 |
| 2,829,490 | Kresse | Apr. 8, 1958 |
| 2,840,322 | Griffith | June 24, 1958 |
| 2,870,601 | Demetriades | Jan. 27, 1959 |
| 2,876,621 | Bogert et al. | Mar. 10, 1959 |

FOREIGN PATENTS

| | | |
|---|---|---|
| 607,686 | Great Britain | Sept. 3, 1948 |